Patented Nov. 28, 1944

2,364,008

UNITED STATES PATENT OFFICE 2,364,008

PROCESS OF MAKING A NUTRIENT MATERIAL

Elmer H. Stuart, Indianapolis, Ind., assignor to Eli Lilly and Company, Indianapolis, Ind., a corporation of Indiana No Drawing. Application September 23, 1940, Serial No. 358,037

1 Claim. (Cl. 99—14)

This invention relates to nutrient substances and more particularly to nutrient materials suitable for oral, rectal, and intravenous administration.

An object of this invention is to provide a material which supplies the necessary nitrogenous materials required for the sustenance of life, which is readily assimilated, which is non-toxic, and which is economical to prepare.

It has been well established that approximately nine or ten amino acids in the presence of other amino acids comprise the necessary nitrogenous materials required for the maintenance of life. (The Chemistry of the Amino Acids and Proteins, by Carl L. A. Schmidt, published by Charles C. Thomas, 1938, page 986.) These amino acids are usually derived from proteins, and ordinarily the human or animal would be adequately supplied with these essential amino acids from foods which are customarily consumed. However, when situations arise which interfere with normal digestion, it is necessary to supply the required elements for sustenance by parenteral administration. For this purpose mixtures of amino acids have heretofore been proposed. A review of the literature reveals the unanimous belief that the digestion of the protein must be such that the protein is broken down into free amino acids. In conformity with this belief, the nutrient material for the supply of nitrogenous material required for the sustenance of life heretofore used intravenously contained essentially free amino acids obtained by the complete digestion of a protein material. (Journal of the American Medical Assn., vol. 112, No. 9, pp. 796–802.) These mixtures of free amino acids, however, have been found to be relatively unsatisfactory.

In accordance with this invention, a nutrient material is provided which supplies all of the nitrogenous materials required for the maintenance of life and which is markedly less toxic than the mixtures of amino acids heretofore employed. This nutrient material is suitable for oral, rectal, and parenteral administration and more particularly for intravenous administration. A group of rabbits was given two grams each of the nutrient material of this invention daily and a similar group was supplied with an equal quantity of mixtures of free amino acids prepared by the complete digestion of proteins with pancreatic enzymes. Both compositions were administered intravenously and the rabbits received no further nutrient material other than glucose and water. The daily loss of weight in the rabbits treated with the nutrient material of this invention was about one half of that of rabbits supplied with the mixture of free amino acids. For a 14-day period, in many cases those treated with the free amino acids died, while in the vast majority of cases the rabbits supplied with the nutrient material of this invention survived.

The nutrient material of this invention comprises polypeptides which are suitable for oral, rectal, and parenteral administration. These polypeptides are water-soluble, are not precipitated by chloracetic acid, and give a positive biuret reaction. Amino acids give a negative biuret reaction. The color obtained in the biuret test with the polypeptides is somewhat different from that obtained from the proteins from which the polypeptides are derived in that the polypeptides yield a characteristic pink color, whereas the original proteins give a blue violet colored biuret reaction. The polypeptides contain chemically-combined amino acids, can be obtained most economically from natural proteins, and are markedly less toxic and more readily soluble in water than are the free amino acids which are chemically combined in the polypeptides. The polypeptides of this invention are soluble in water having a hydrogen ion concentration of pH 6.

The polypeptides of this invention are prepared by digesting a protein in a medium having a pH between 4 and 5 with a proteolytic enzyme, such as papain, or those occurring in liver, kidney, and other animal tissue. However, it is preferred to employ papain. The protein is desirably a natural protein, such as casein, the protein from soy bean, or certain animal tissues. Preferably, the protein or plurality of proteins employed for preparing the polypeptides contains all of the amino acids required for the supply of the necessary nitrogenous materials for the sustenance of life. The rate at which the digestion proceeds is dependent upon the temperature. Most proteolytic enzymes operate most satisfactorily at about 37° C. Temperatures below 37° C. require a much longer period of digestion. In the case of papain, the rate of digestion may be markedly increased by using temperatures as high as 70° C. This digestion is continued desirably until the amount of free carboxyl groups in one gram of the dried digested material is equivalent to between 0.075 and 0.2 gram of sodium hydroxide. The free carboxylic group is determined by the method described in Allen's Commercial Organic Analysis, fifth edition, published by P. Blakiston's Son & Co., Inc., 1930, pp. 727–729, in the modification in which 85% acetone is used instead of alcohol. The digested mixture is then heated to about 100° C. to coagulate undigested proteins; and after coagulation the insoluble proteins are removed from the mixture by any suitable means, such as decantation, filtration, or centrifugation. If the digestion of the protein is permitted to proceed so that one gram of the material neutralizes an amount of sodium hydroxide greater than 0.2 gram, the protein or polypeptides are broken down into free amino acids. When the digestion progresses in accordance with this invention and one gram of the dried digested material is equivalent to 0.075 to 0.2 gram of sodium hydroxide, the material comprises primarily polypeptides. Heretofore, it was considered necessary to break down substantially completely the proteins to amino acids so that approximately 95% of the nitrogen in the resulting product was in the form of free amino acids.

Alternatively, the digestion of the protein in accordance with this invention may be continued until the α-amino nitrogen is between 0.5% and 3.0% of the dried product as determined by the Van Slyke method described in Comp. rend. du Lab. Carlsberg, Ser. Chim., vol. 22, pp. 480–486.

After the insoluble proteins have been removed, the digested mixture may be used as a nutrient material. This nutrient material is not precipitated by chloracetic acid, and if desired the digestion may be controlled by this test although the two tests heretofore described are preferred. If desired, the digested material may be evaporated to dryness and the residue may be redissolved for administration orally, rectally, or parenterally. However, it is preferred that the digested mixture be further refined by a redigestion process. To produce these improved polypeptides, the digested mixture, after removal of the insoluble proteins, is adjusted to a pH of about 4.5 and is then redigested with a proteolytic enzyme, such as papain, until the pH of the solution has reached a constant value. Preferably, the temperature is maintained at 37° C., although, as heretofore stated, the digestion may be practiced at other temperatures. It is then heated to about 100° C. to destroy the proteolytic enzymes. The insoluble material is desirably removed. The resulting solution may be used in that form or evaporated to dryness and redissolved. Animals to which this refined product is administered intravenously lose less weight over a period of time than those receiving the unredigested product.

Many proteins, such as casein, are known which contain all of the amino acids required for the maintenance of life in humans and animals. Accordingly, to produce a nutrient material comprising primarily a plurality of polypeptides which contain these amino acids chemically combined, such protein is digested in accordance with the method heretofore outlined. In the event that a protein is deficient in a particular required amino acid, such amino acid is added to the digestion mixture prior to the preparation of the nutrient material.

Typical examples of nutrient materials prepared in accordance with this invention are as follows:

*Example 1.*—Nutrient material obtained from commercial casein.

300 gallons of distilled water in a digestion kettle are adjusted to a temperature of about 17° C. To the water are added five pounds of sodium citrate and 100 pounds of commercial casein. (The sodium citrate is employed as a buffer salt.) Four pounds of papain, which has first been dissolved in water, are added together with 2.5 quarts of toluene as a preservative. The kettle is then closed and 2 lbs. 14½ oz. of hydrogen sulfide are introduced into the solution, while the solution is gently agitated in the closed kettle. This quantity of hydrogen sulfide is usually sufficient to reduce the pH to about 4.5. Desirably, the mixture is tested at this point to insure that the pH is between 4 and 5. The mixture is allowed to stand for about two hours and then gradually warmed during about 24 hours to between 40° and 50° C. Thereafter it is stirred twice daily until such time as a sample indicates that the free carboxyl groups in one gram of the dried material are equivalent to between 0.075 g. and 0.2 g. of sodium hydroxide, or the α-amino nitrogen is between 0.50% and 3.0% of the dried material. This procedure usually requires from five to ten days, depending on the temperature at which the material is digested and during this time the casein is essentially broken down into polypeptides. The mixture is then heated to boiling for a period of 10 to 15 minutes, cooled to about room temperature, and filtered. The filtrate is returned to the kettle, and one pound of papain and 2.5 quarts of toluene are added. Sufficient hydrogen sulfide is added to reduce the pH to about 4.5. Usually about one pound of hydrogen sulfide is required for this purpose. The solution is digested at about 37° C. until such time as the pH has reached a constant value. This procedure requires from six to ten days. It has been found that this final pH varies according to the type of protein material used, but in this case, which is casein, it is approximately 5; in the case of the protein of soy bean, it is approximately 5.8; in the case of the protein of liver it is approximately 6.3. The mixture is then heated to boiling to destroy the enzymes, cooled, filtered, and the filtrate evaporated to dryness in vacuum. The dry material obtained from the filtrate which contains the polypeptides has total nitrogen 11.68%, α-amino nitrogen 1.95%, free carboxyl groups in one gram equivalent to 0.16 g. sodium hydroxide, and gives a characteristic pink color biuret reaction. The polypeptides are soluble in a water solution having a pH of 6.

*Example 2.*—Nutrient material obtained from the protein of soy bean.

To 10,000 cc. of water are added in a digestion kettle 475 g. of fat-free soy bean meal, 25 cc. of toluene, 20 g. of papain, and 12 g. of hydrogen sulfide. The top of the kettle is closed and the mixture is maintained at 50° C. until the free carboxyl groups in one gram of the dried material are equivalent to between 0.075 g. and 0.2 g. of sodium hydroxide or the α-amino nitrogen is between 0.5 and 3.0% of the dried material. This procedure usually requires a digestion of about one week. The mixture is boiled 15 minutes, cooled, and filtered. To the filtrate are added 4 g. of papain, 25 cc. of toluene, and about 4 g. of hydrogen sulfide. This mixture is then digested at 37° C. until the pH attains a constant value of about 5.85. The mixture is then heated to boiling to destroy the enzymes, cooled, filtered, and the filtrate evaporated to dryness in vacuum. The dry material obtained from the filtrate contains total nitrogen 10.06%, α-amino nitrogen 3.15%, free carboxyl groups in one gram equivalent to 0.15% sodium hydroxide and gives a characteristic pink color biuret reaction. These polypeptides are soluble in a water solution having a pH of 6.

*Example 3.*—Nutrient material obtained from the protein of liver.

To 1500 g. of fresh ground hog liver in a digestion kettle are added 10,000 cc. of water containing 25 cc. of toluene and 15 g. of hydrogen sulfide. (The enzyme is contained in the liver itself. To facilitate the digestion, if desired, 20 g. of papain may be added.) The mixture is digested at a temperature between 37° and 50° C. until the free carboxyl groups in one gram of the dried material are equivalent to between 0.075 g. and 0.2 g. of sodium hydroxide, or that the α-amino nitrogen is between 0.5% and 3.0% of the dried material. During this period, the protein in the hog liver is converted substantially into polypeptides by the naturally occurring proteolytic enzymes in the hog liver. The mixture is heated to boiling, cooled, and filtered. To the filtrate are added 25 cc. of toluene, 4 g. of papain, and 5 g. of hydrogen sulfide. The mixture is digested at about 37° C. until the pH attains a constant value. The mixture is heated to boiling, cooled, filtered, and the filtrate evaporated to dryness in vacuum. The dry material obtained from the filtrate contains total nitrogen 12.12%, α-amino nitrogen 2.08%, free carboxyl groups in one gram of the dried material equivalent to 0.16 g. sodium hydroxide and gives a characteristic pink color biuret reaction. The polypeptides are water-soluble in a solution having a pH of 6.

While preferred embodiments of this invention have been described, various modifications may be made therein without departing from the scope of the appended claims.

What is claimed is:

The process of making a nutrient material suitable for oral, rectal, and parenteral administration, which consists in subjecting protein material to digestion with papain in the presence of sufficient hydrogen sulfide to produce a pH between 4 and 5, at a temperature between 37° and 70° C. for a period of several days and until test of a sample removed and heated to boiling and filtered and dried indicates that one gram of the dry material is neutralized by between 0.075 g. and 0.2 g. of sodium hydroxide, then heating to about 100° C. to coagulate proteins, and then removing insoluble material.

ELMER H. STUART.